United States Patent [19]

Fresia

[11] Patent Number: 5,549,436
[45] Date of Patent: Aug. 27, 1996

[54] TRACTOR FOR TOWING AIRCRAFT THROUGH ITS CENTRAL FRONT STEERING WHEELS, WHICH MAY BE LIFTED OR NOT

[75] Inventor: Mauro Fresia, Millesimo, Italy

[73] Assignee: Fresia S.p.A., Italy

[21] Appl. No.: 308,737

[22] Filed: Sep. 19, 1994

[30] Foreign Application Priority Data

Sep. 20, 1993 [IT] Italy ................... GE93A0082

[51] Int. Cl.$^6$ .................................................. B60P 3/11
[52] U.S. Cl. ........................ 414/426; 414/427; 414/429; 180/904
[58] Field of Search ......................... 414/426–430, 414/458, 471, 474; 244/50; 180/904

[56] References Cited

U.S. PATENT DOCUMENTS

| | | | |
|---|---|---|---|
| 3,119,502 | 1/1964 | Paul | 414/427 X |
| 3,749,266 | 7/1973 | Gordon | 414/430 |
| 4,375,244 | 3/1983 | Morin | 414/429 X |
| 4,632,625 | 12/1986 | Schuller et al. | 180/904 X |
| 4,655,670 | 4/1987 | Högberg et al. | 414/458 |
| 4,810,157 | 3/1989 | Schopf | 414/429 |
| 4,950,121 | 8/1990 | Meyer et al. | 414/428 |
| 5,259,572 | 11/1993 | Franken et al. | 414/426 X |
| 5,302,076 | 4/1994 | Bammel et al. | 414/428 |

FOREIGN PATENT DOCUMENTS

| | | | |
|---|---|---|---|
| 0331363 | 2/1989 | European Pat. Off. | |
| 0309760 | 4/1989 | European Pat. Off. | |
| 0582204 | 2/1994 | European Pat. Off. | 180/904 |
| 795323 | 5/1958 | United Kingdom | |
| 8500790 | 2/1985 | WIPO | 414/430 |
| 9000775 | 5/1990 | WIPO | |
| 9000137 | 5/1990 | WIPO | |

Primary Examiner—James W. Keenan
Attorney, Agent, or Firm—Graham & James LLP

[57] ABSTRACT

Tractor (1) with driver's cab (2) at the rear, featuring a recess (3) in the front part of which the front steering wheels (4) of the aircraft are entering and are blocked by idle front rollers (28) which may be moved inwards or outwards and an idle rear roller (36) driven by hydraulic fluid powered pistons (31, 34). According to one solution, an apron (32) is mounted on the tractor framework (1) on which apron (32) the wheels (4) of the aircraft will rest. This apron is lifted and lowered by hydraulic fluid powered pistons (7) connected to the articulated upper arm (9) of each tractor wheel (6).

15 Claims, 10 Drawing Sheets

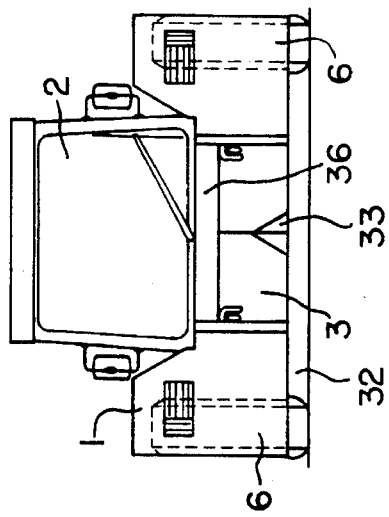
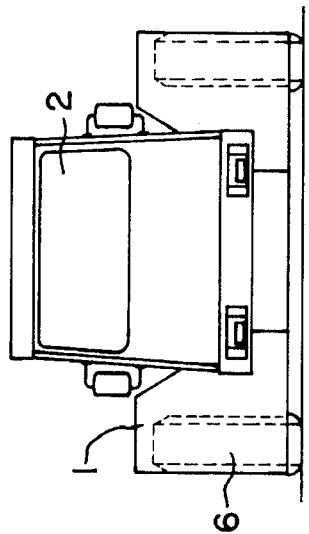
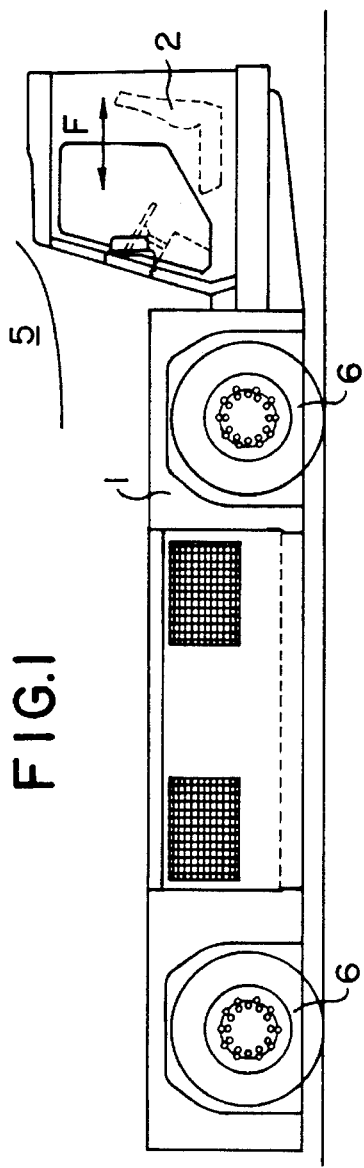
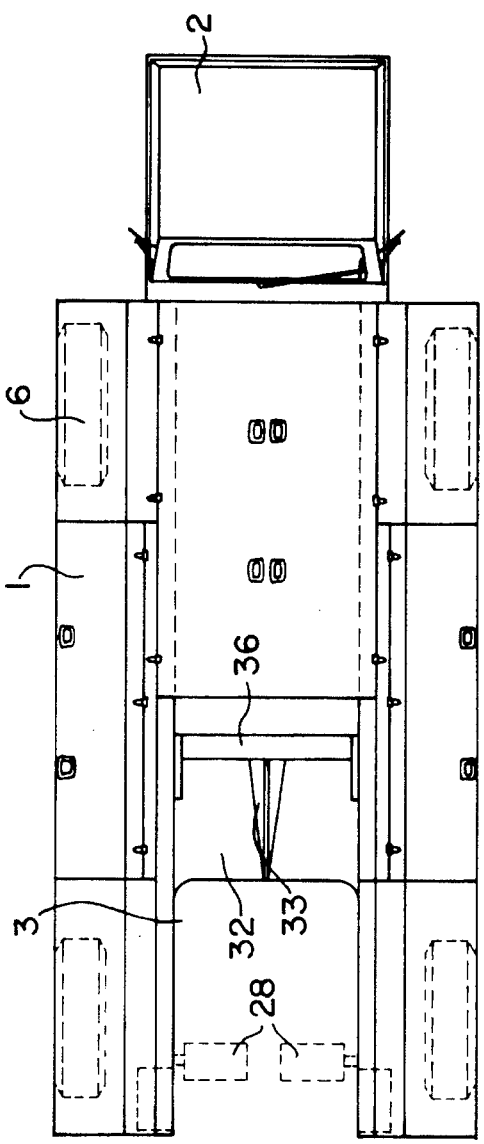

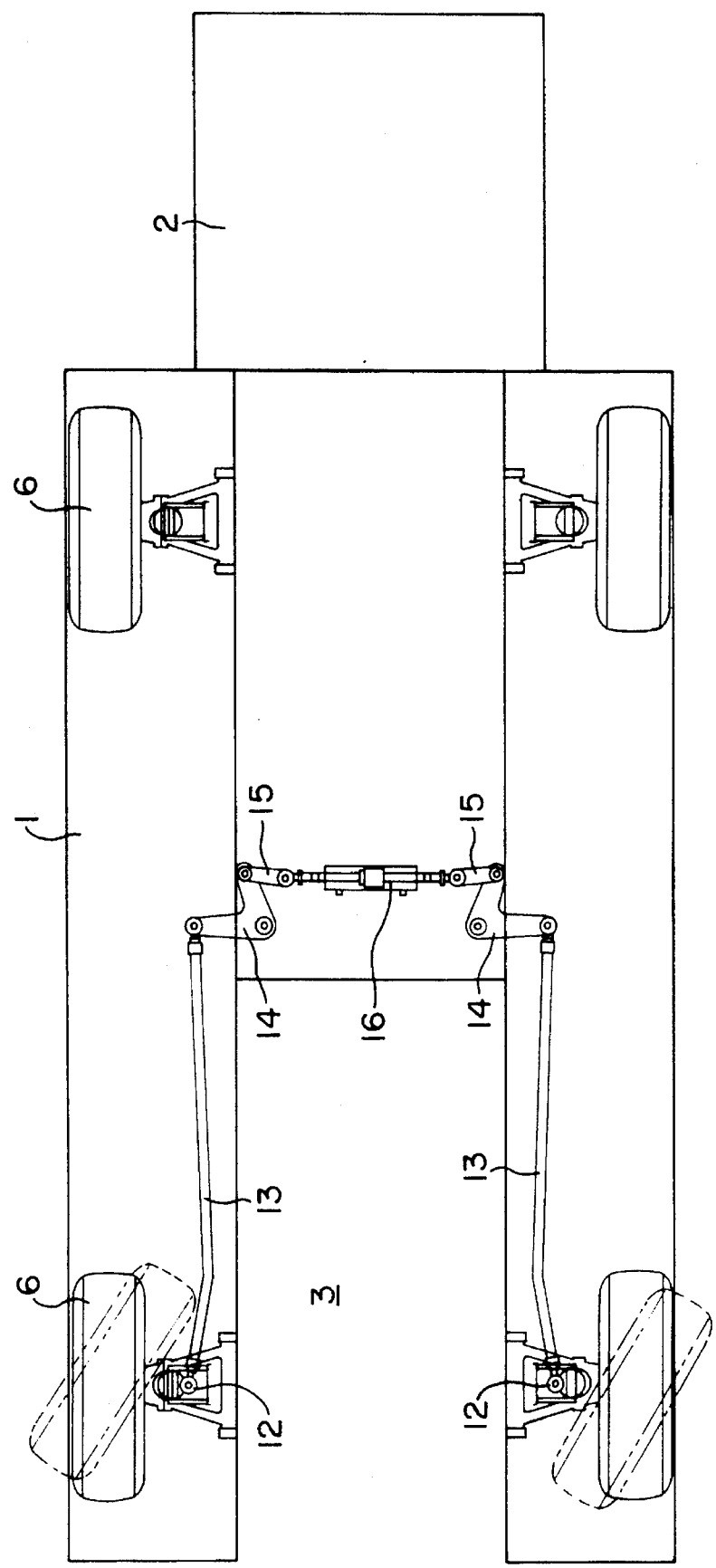

5,549,436

TRACTOR FOR TOWING AIRCRAFT THROUGH ITS CENTRAL FRONT STEERING WHEELS, WHICH MAY BE LIFTED OR NOT

BACKGROUND OF THE INVENTION

This invention covers a tractor without drawbars for towing aircraft through its front steering wheels, which may be lifted or not. Several types of vehicles are known to tow airplanes, but they all have some drawbacks and defects. For instance, U.S. Pat. No. 2,987,133 illustrates a towing vehicle provided with a long rotating framework, the free end of which is fitted with two wheels driven by the framework and a system connecting the wheels of the aircraft to the shaft. The wheels rotating in touch with the aircraft cause the latter to move. This solution is rather complicated, its functioning is uncertain and requires complex coupling and hooking up operations.

Other solutions, such as U.S. Pat. No. 3,025,922 and DE-A-2826161 are known, consisting in a device like a motor-driven hoe, provided with a motorized roller in contact with one wheel of the airplane. Obviously, these solutions can only be used for moving small and light aircraft.

U.S. Pat. No. 3,005,510 is also known, which features a motor-driven belt to be inserted between the wheel sets of the aircraft. However, this solution can usually not be adopted on normal airliners.

Finally, EP-A-0156842 is known, grouping two original Finnish Patents FI-A-75310 and FI-A-78426. This document describes a trolley with a recessed central zone in which the lateral non steering wheel or wheels of the airplane may penetrate. This trolley is provided with mobile rollers, moving in transverse vertical as well as in horizontal lengthwise direction, so that they may be placed adjacent, in front of or behind the wheels of the aircraft. At least one of these rollers is motor-driven and will drive the non-steering wheels or set of lateral wheels of the plane.

But even this latter solution has some drawbacks. Since the trolley has no driving wheels, it has to be driven by an automotive vehicle. The rollers in touch with the lateral wheels of the aircraft are rather small, with little towing friction and there are no means to ensure a stable lateral support for the wheels of the airplane. These rollers are supported on one side only by the bearing frame so that they may get warped and deviated from their direction of motion. The above described towing device is applied to the lateral non-steering wheels of the airplane, so that the pilot has to steer the plane during towing or other persons shall move the front steering wheels of the aircraft with the aid of proper equipment.

Furthermore, the front and rear rollers are controlled by one single mechanism that will approach and grip the wheels of the airplane so that the docking manoeuvre takes much time and is difficult.

Recently, equipment described in the above mentioned EP-A-0156842 was mounted on a tractor, but the drawbacks still remain.

Recently the European Patent No. 93112100.8 has been filed covering a tractor to tow airplanes through its front steering wheels. The tractor is essentially provided with two motor-driven front rollers mounted on a transverse mobile axle, lengthwise to the tractor, while two more motor-driven rollers at the rear are revolving around a vertical axis from a central to a lateral position and vice-versa. The steering front wheels of the aircraft are gripped between these roller sets which, being motor-driven, will cause the aircraft wheels to rotate thus towing the aircraft without direct intervention of the tractor, the driving system of which is cut-out during towing.

SUMMARY OF THE INVENTION

This invention has the aim to provide a tractor for towing aircraft through its two front steering wheels, without using drawbars and without motor-driven rollers.

Essentially, the tractor subject matter of this invention consists of a rear driver's cab, four wheels, two of which are motor-driven and two are steering wheels; a recess is provided in the front part of the platform (steerage being reversed with respect to normal steering, so that the tractor can more easily approach the wheels of the airplane), an idle roller having its axis transverse to the tractor, is placed in this recess and is supported by levers controlled by hydraulic fluid powered pistons thus moving the idle roller back and forth. Two idle front rollers are located in the front part of the recess and are mounted on their axes, the rear end of which is connected to a sliding device causing the front rollers to approach the rear roller and vice-versa as well as the rotation of these front rollers during their opening phase to permit the aircraft wheels to enter and leave the tractor recess. Through this solution, the airplane is towed by motorization of the tractor.

Furthermore, according to a first solution of this invention, the tractor has an apron that may be lowered to receive and unload the front steering wheels of the airplane and is lifted during towing. This apron is rigidly connected to the tractor frame; hydraulic fluid powered pistons and a leverage system will jack up the apron and framework with respect to the tractor wheels.

In a second solution according to this invention, the tractor, similar to the first solution, is however without apron so that the front steering wheels of the aircraft remain on the ground.

BRIEF DESCRIPTION OF THE DRAWINGS

These and other characteristics of the tractor in question are illustrated for exemplification purposes in the enclosed drawings, in which:

FIG. 1 shows a lateral view of the tractor towing the aircraft between its two front steering wheels and provided with lifting apron;

FIG. 2 shows a top view of the tractor illustrated in FIG. 1

FIG. 3 shows a front view of the tractor illustrated in FIG. 1

FIG. 4 shows a rear view of the tractor illustrated in FIG. 1

FIG. 5 shows a top view of the steering system of the tractor front wheels illustrated in FIG. 1

DETAILED DESCRIPTION OF THE PREFERRED EMBODIMENTS

Figure 6:
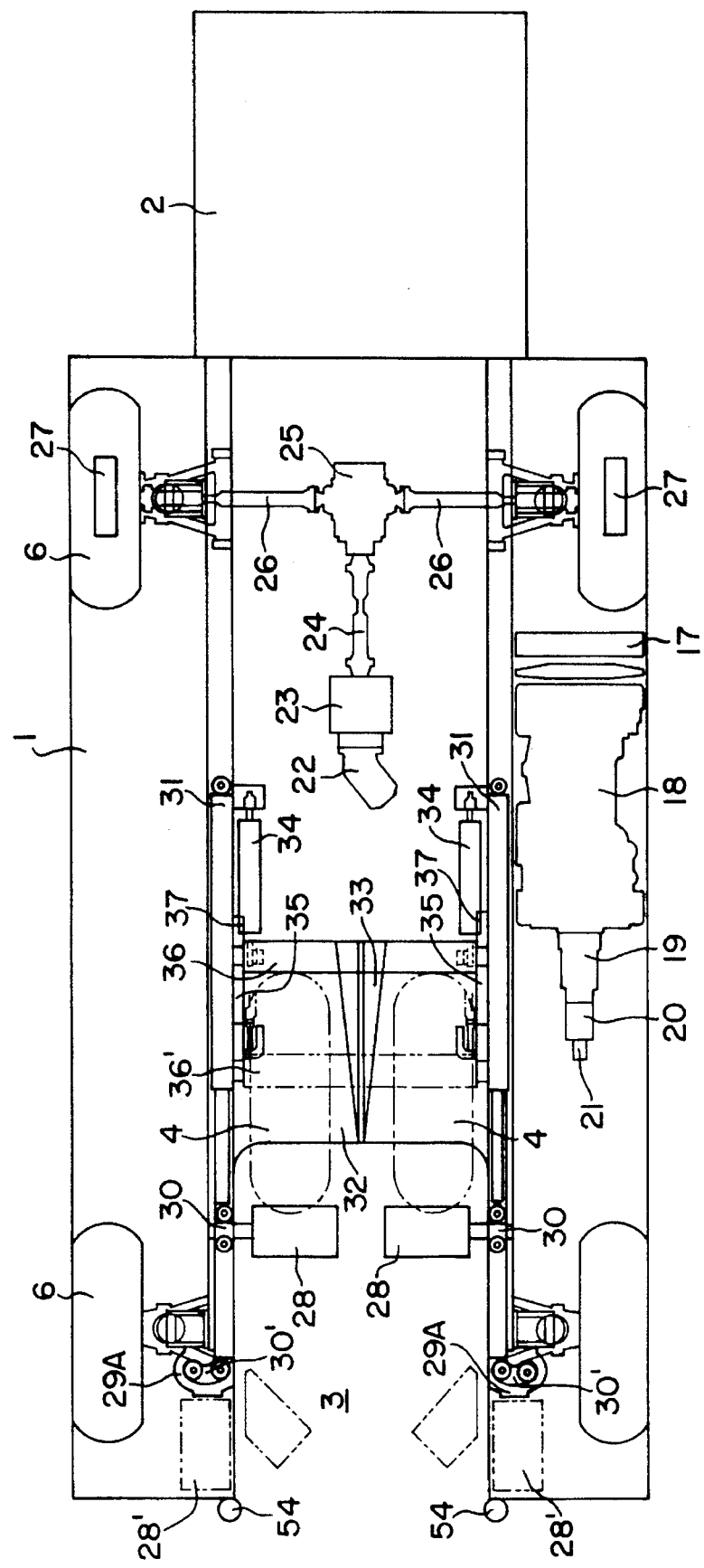
FIG. 6 shows a top view of the operating system of the tractor according to FIG. 1

FIGS. 1 thru 9 show the solution for a tractor with apron on which to lift the front steering wheels of the aircraft. In this figure, 1 indicates the tractor with selfbearing framework, the driver's cab 2 being located at the rear, while a recess 3 in the front part will receive the front steering wheels 4 of the aircraft 5 and the related docking system.

The driver's cab 2 is provided with a control system for moving back and forth, on support member 2a in direction of the arrow F in FIG. 1 so that it will be possible to adjust the distance between the cab 2 and the airplane having its nose 5 positioned above the cab 2 during towing.

The tractor has four tyre mounted wheels 6, two of which are driving wheels. Each wheel 6 (cf. FIG. 9) is supported by one end of knuckle arms and in particular by an upper 9 and by a lower knuckle arm 10, the other end of these knuckle arms being secured to the chassis or framework of the tractor 1. The upper arm 9 is suspended and controlled by a hydraulic cylinder 7 lifting and lowering the tractor frame and a nitrogen bell 8. A microswitch 11 acts as a limit switch for suspension movements so that it will be possible to take advantage of the whole capacity of the hydraulic cylinder 7 to jack up the tractor framework 1 on which the aircraft is resting, as will be described hereinafter and to ensure, with the aid of the bell 8, comfortable driving conditions for the tractor including traversing movements caused by the wheels 4 of the aircraft 5. The operation mode of the assembly will be explained in the following pages.

The front wheel set 6 (FIG. 5) are steering by means of a servo-assisted hydraulic mechanism that will let the front part of the recess free. This mechanism will have for each wheel 6, a control arm 12, a control rod 13 for the arm 12, an intermediate lever control and steering adjustment, a knuckle 15 connecting the lever 14 to the double acting cylinder 16 controlling both wheels 6.

Figure 13:
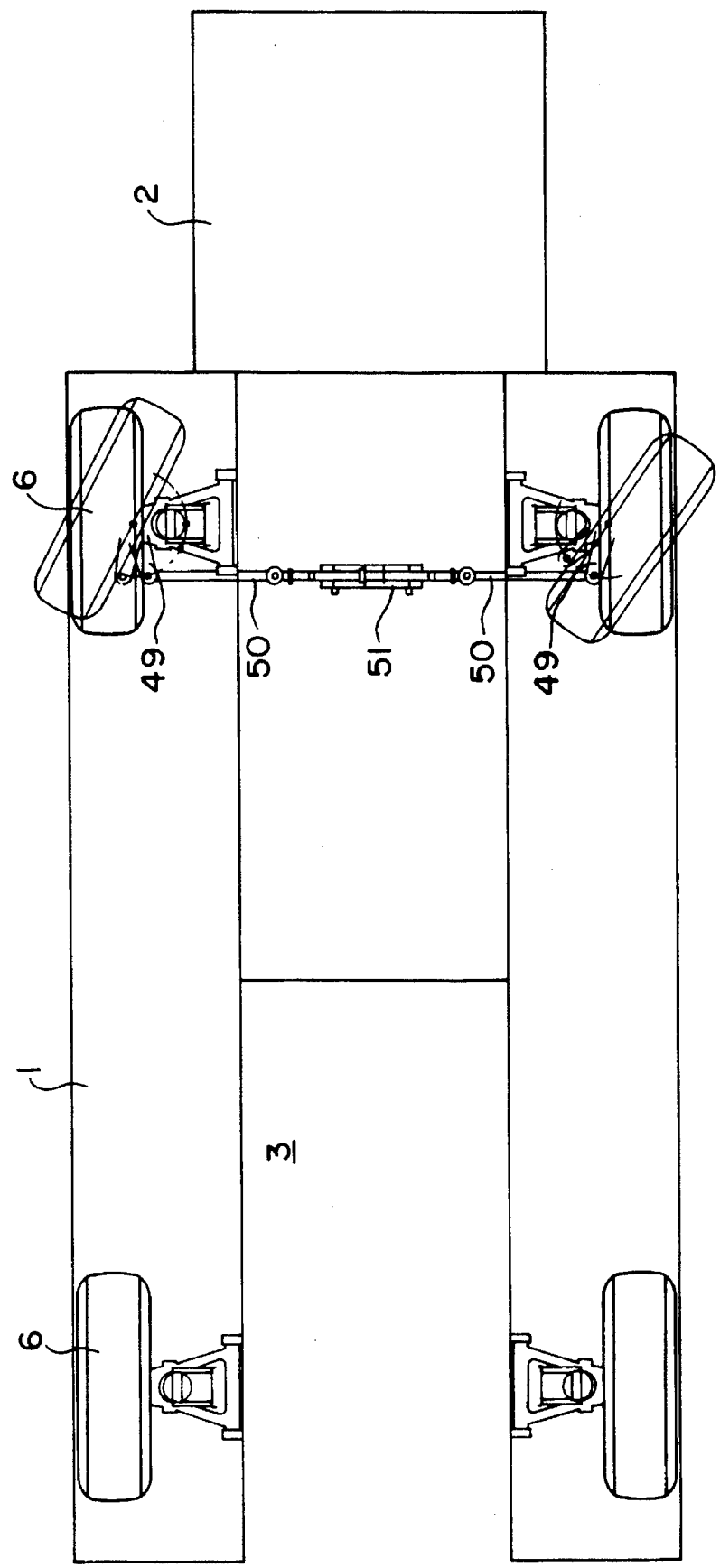
FIG. 13 shows a top view of the steering system for the rear wheels of a tractor without apron.

Normally, the rear wheels 6 are not steering, but they might be as shown in FIG. 13.

The tractor is driven by a heat engine and by a hydromotor or by a hydrodynamic gear with reduction and differential unit. The tractor may also have an electric motor with storage battery. The engine or motor is mounted sideways so as to offer the driver ample view and maximum safety during docking and manoeuvring of the aircraft.

In detail, the utilization of a heat engine will involve the following components, as shown in FIG. 6:

a radiator 17 of the engine;

a heat engine 18;

a hydrostatic pump 19;

a hydraulic pump 20 controlling the suspensions and the aircraft docking rollers;

a pump 21 operating the brakes a hydromotor 22 a tow-speed reduction gear 23 a cardan joint 24 a differential unit 25, drive shafts 26 reduction gears 27 for the driving wheels 6.

The main characteristic of the tractor subject matter of this invention is its system for docking and knockoff of the front steering wheels 4 of the aircraft, in sequence associated with the wheel lifting device by means of the suspension cylinders 7 of the tractor 1.

Figure 8:
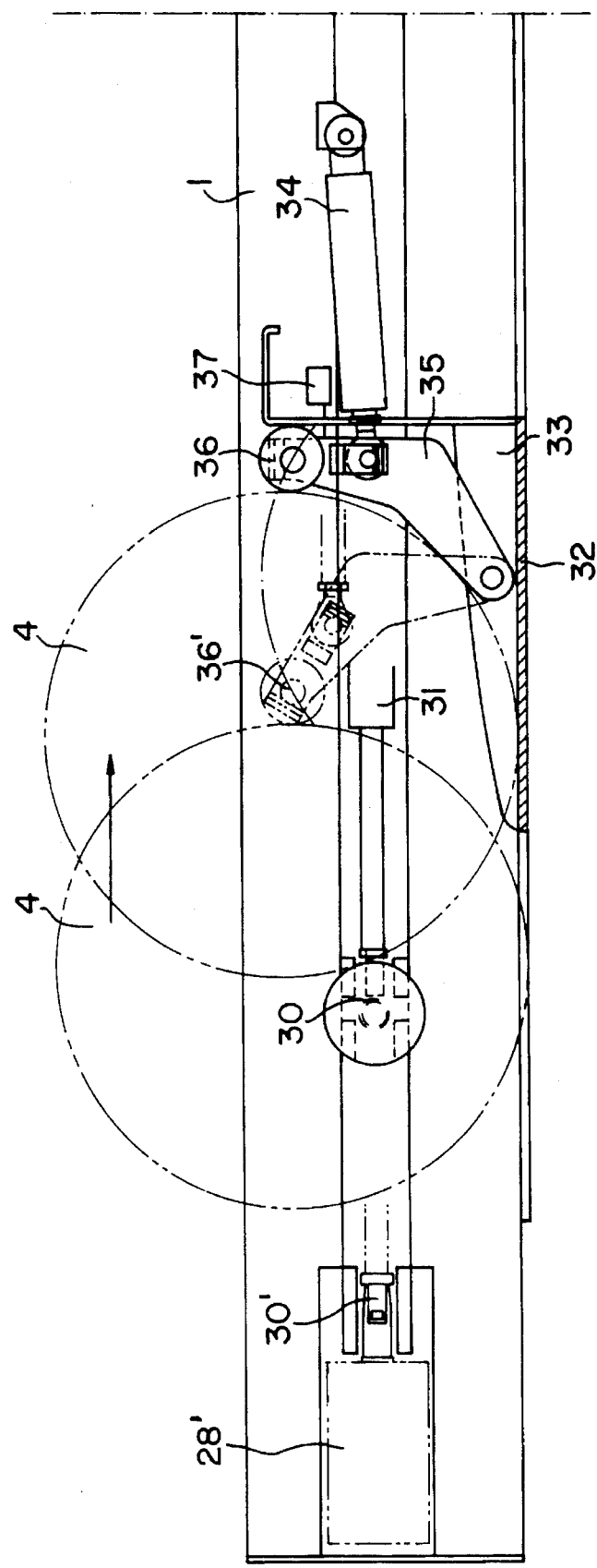
FIG. 8 shows a magnified lateral view of the docking system for the front steering wheels of the airplane.
Figure 9:
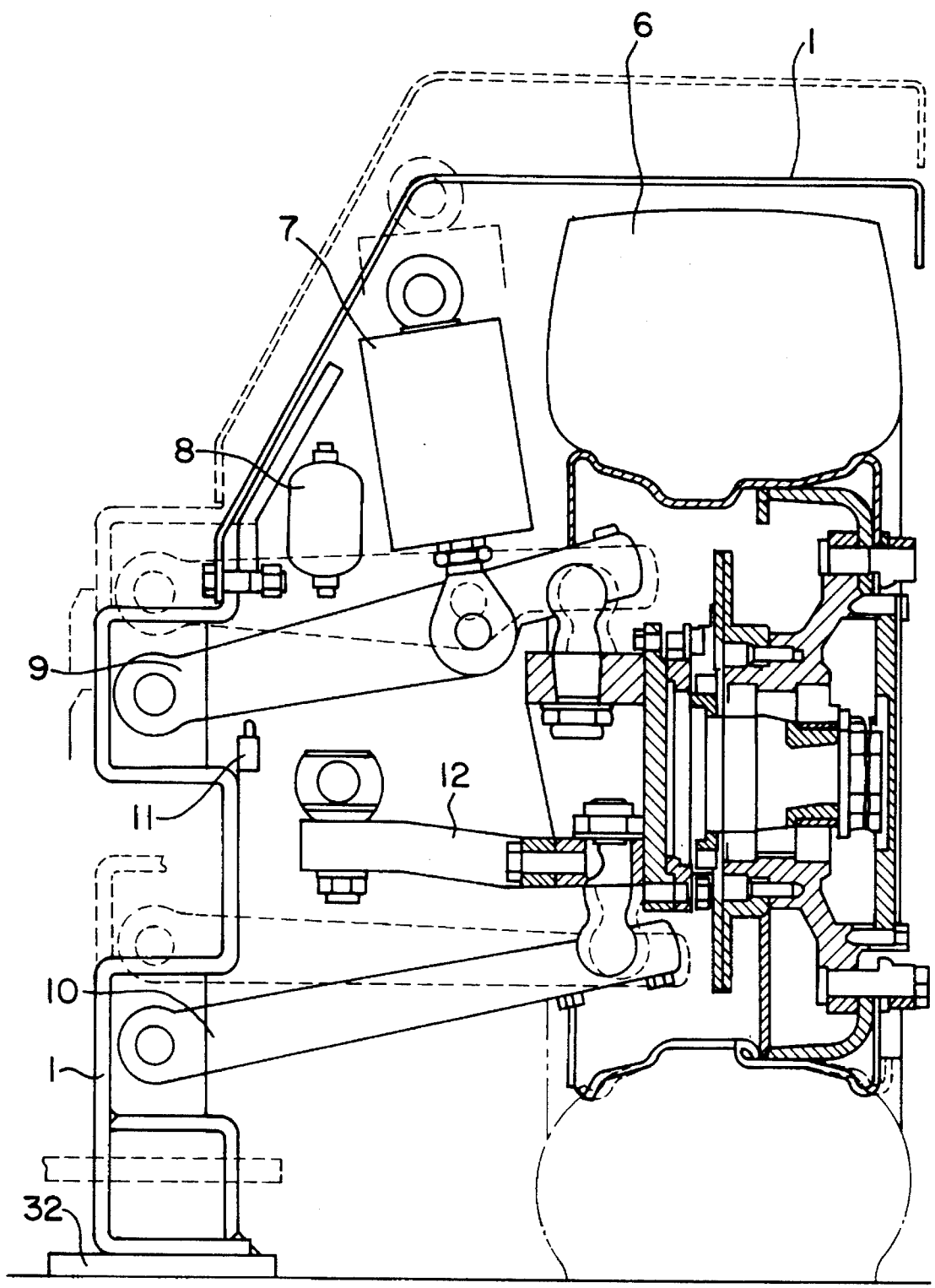
FIG. 9 shows a magnified detail of the supporting devices on each tractor wheel with the possibility to jack up the framework and apron on which the airplane wheels are resting.

This docking and knockoff of the front steering wheels 4 of the airplane is shown in FIG. 6 and 8. As already explained, the tractor 1 has a recess 3 in its front part in which the wheels 4 of the front undercarriage may be lodged. The recess 3 has also anapron 32 connected to the framework of the tractor 1 on which the wheels 4 of the plane will mount to be lifted.

This docking and knockoff system has also two frontal and sideways positioned idle rollers 28, connected by their shaft to lateral sliders 30 moving in guides 29; the front end of these guides has a cam shaped outwards bent deflection 29A. These sliders 30 are moving in the guides 29, 29A by means of hydraulic fluid powered pistons 31. When the sliders are running in the straight longitudinal section 29, the rollers 28 are inwards directed, but when the sliders 30 enter the cam section 29A of the guide, they take a 90° turn to occupy the position 28'. The external rollers will permit the entrance and exit of the aircraft wheels 4, whereas in central position 28, they will push against these wheels when entering the recess 3, pushing them on the apron 32 where they are blocked during towing.

The rear device for docking and knockoff of the aircraft wheels 4 after towing consists of an idle roller 36 having its axis transverse to the tractor, supported at both ends by two lateral levers 35 hinged on fixed pivots. Two lateral hydraulic fluid powered pistons 34 cause the levers 35 to rotate while moving the idle roller 36, 36' backwards and forewards. It is clear that the aircraft wheels 4, when entering the recess 3 of the tractor 1, will rest against the idle roller 36' and will be pushed on the apron 32 by the front rollers 28, thus moving the rear roller into its position 36. The wheels 4 of the aircraft will thus remain imprisoned between the rollers 28, 36 while resting on the apron which will then be lifted for towing. After towing and after the front rollers 28 have been opened, the controlled pressure cylinders are actuated, pushing the idle rear roller 16 foreward, which in turn knocks off the wheels 4 from the apron 32.

The wheels 4 of the aircraft are blocked on the apron by microswitches 37 triggered by the levers 35 of the supporting and knockoff roller 36.

The apron 32 has a central wedge shaped guide step 33 to guide the aircraft wheels 4.

The apron is rigidly connected to the tractor framework 1 so that, when actuating the hydraulic cylinders 7 of the suspensions, the whole tractor framework 1 is jacked up, including the apron 32, which in turn lifts the wheels 4 of the airplane. This means that the wheels 4 of the plane are not resting on the ground during towing and that the tractor-aircraft assembly is steered only from the driver's cab.

Figure 7:
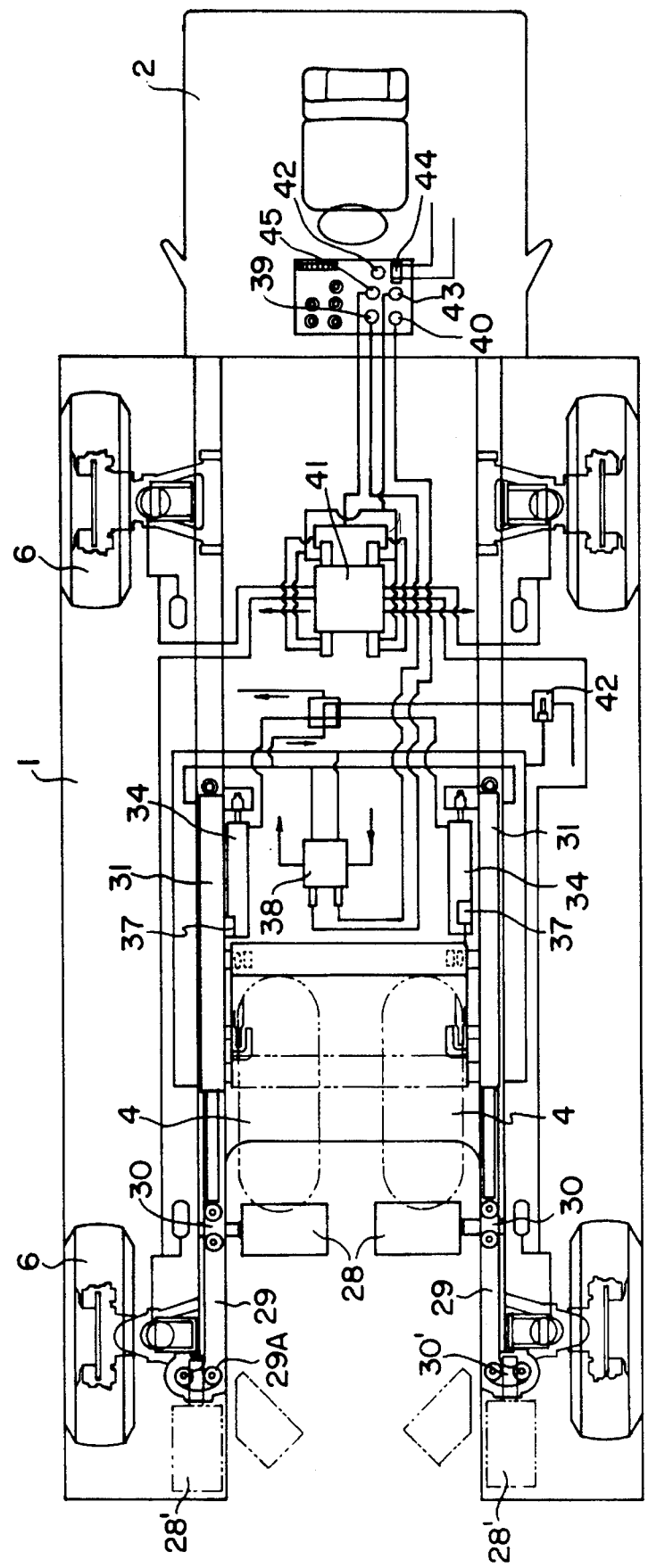
FIG. 7 shows an elementary operating diagram of the mechanism illustrated in FIG. 6

The control system of the tractor 1 further includes the following, as illustrated in FIG. 7:

a hydraulic distributor a control pushbutton 39 actuating the cylinders 31 which close the idle front rollers 28;

a control pushbutton 40 to open the rollers 28;

a proportional distribution valve 41 controlling the various services of the wheel suspensions 6;

a pressure release valve 42 for pressure control of the knockoff pistons 34 a pushbutton 43 jacking the suspension cylinders 7;

a handling lever 44 for the tractor 1;

a pushbutton 45 to lower the suspension cylinders 7. Based upon the foregoing, the operation sequence to load the aircraft on the tractor is as follows:

the driver brings the tractor in line with the front wheels of the aircraft, until the aircraft wheels enter the recess 3, resting against the roller 36 which is moved in its position 36';

he then lowers the tractor by acting on the pushbutton 45.

Only after the tractor is lowered can the driver press the pushbutton 39 acting on the cylinders 31 brining the pusher rollers in touch with the aircraft wheels 4 and pushing them on the apron 32;

the microswitches 41 will stop the wheels 4 in the correct position.

The valve 42 adjusts the pressure of the two controlled pressure cylinders 34 until the wheels 4 are in touch with the roller 36 and with the roller 28 at the correct pressure After the aircraft is loaded on the tractor, the driver presses the pushbutton actuating the suspension cylinders 7 jacking up the tractor. The amount of jacking up is limited by the microswitches 11.

Upon completion of the foregoing operations, the aircraft is moved forwards or backwards by pushing or pulling while acting on the lever 44.

According to need, the heat engine is accelerated until the required speed is reached.

When the aircraft has been pushed or pulled into the correct position, the aircraft wheels are removed from the tractor apron as follows:

the driver first of all presses the pushbutton 45 acting on the suspension cylinders 7 to lower the platform 32 and the airplane to ground level;

he then presses the pushbutton 40, actuating the cylinders 31 which release the aircraft wheels 4 from the grip of the cylinders 28 until they reach their rest position 28';

the roller 36 controlled by the cylinders 34 will then automatically unload the aircraft from the apron 32;

after unloading, the driver presses the pushbutton 43 to jack up the tractor while acting on the lever 44 to select the tractor speed gear;

he then steps on the gas pedal to drive away at the required speed.

A second solution, according this invention, is very much similar to the first one described above except for the fact that there is no apron 32 on which the wheels 4 of the aircraft are lifted. In this second solution, the wheels 4 are equally blocked by the rear roller 36 and by the front rollers 28, but they remain on the ground; during towing, the aircraft wheels are rolling on the ground causing the rollers to rotate since the apron 32 and the related wedge shaped guide step 33 are lacking; the front 28 and rear rollers 36 are provided with ring shaped blocking and guiding devices 46 as shown in FIG. 10, 11 and 12.

Figure 10:
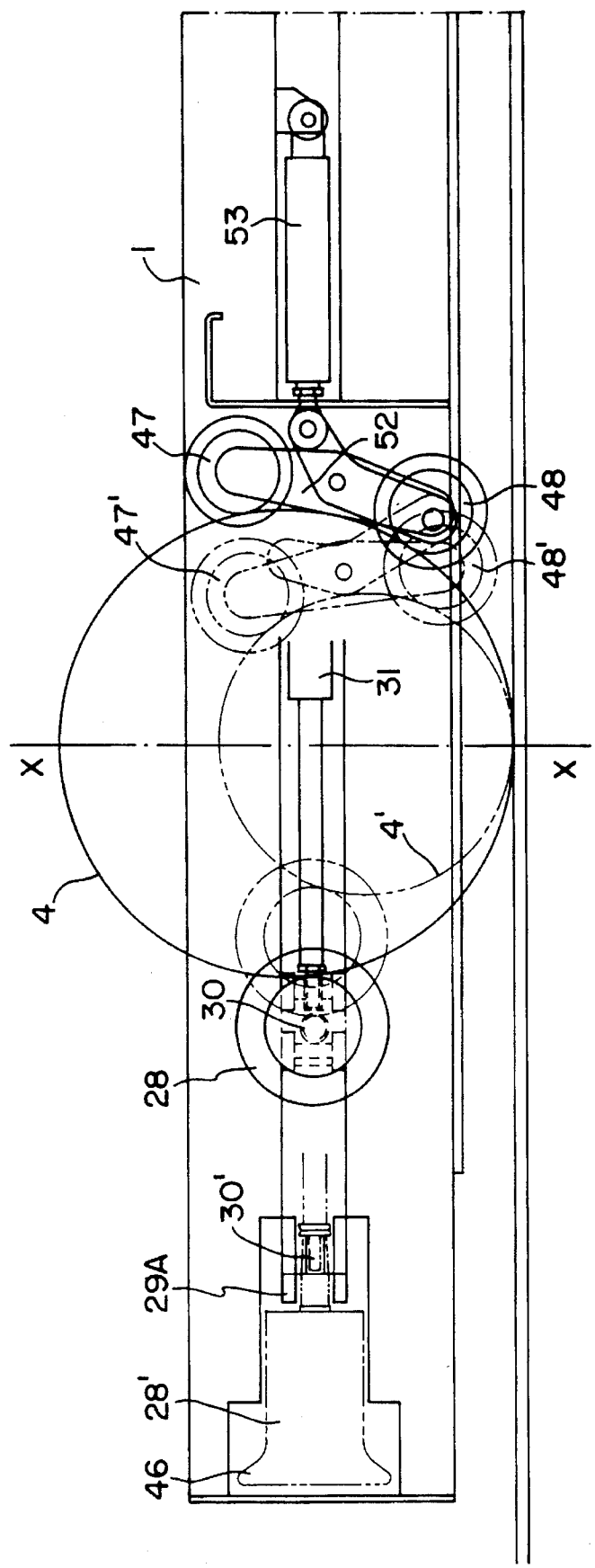
FIG. 10 shows a lateral view of a variation of the mobile articulated support of the rear roller for a tractor without apron on which to lift the aircraft wheels.

FIG. 10 shows the position of the front 28 and rear rollers 36 when in touch with the wheels 4, 4' having different diameters and belonging to medium-large sized aircraft (AERBUS) or medium-small airplanes (DC9) categories.

Figure 11:
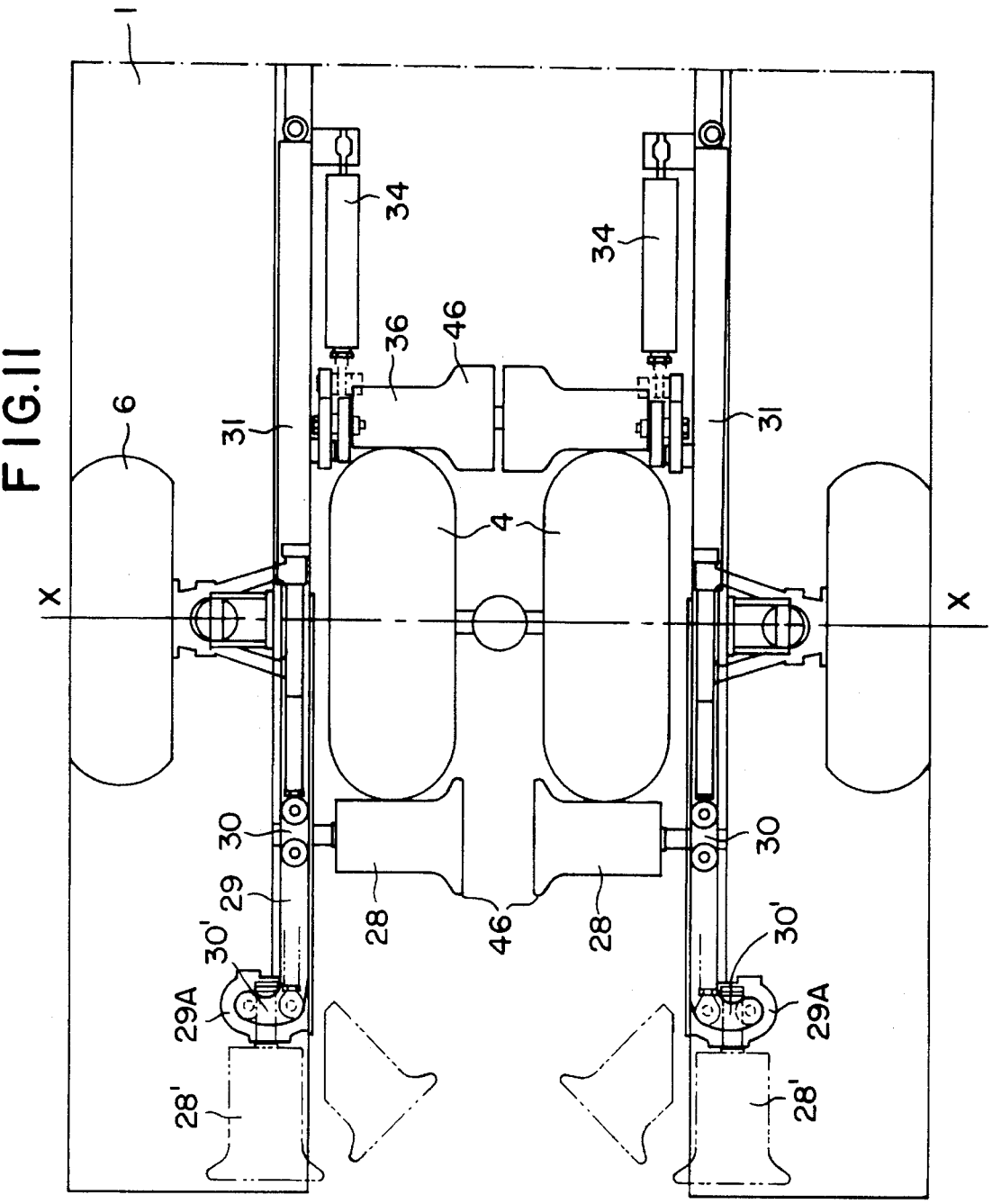
FIG. 11 shows a top view of the variation illustrated in FIG. 10.

According to FIG. 10 and 11, two rollers 47, 48 are mounted instead of one single rear roller 36 since they better adjust to the various diameters of the aircraft wheels 4, 4' and may be used to position the different sized wheels 4, 4' with their axle on a transverse plane X—X with respect to the tractor 1, also including the front wheel axles 6 of the tractor. These rollers 47, 48 are supported at both ends by two levers 52 actuated by hydraulic fluid powered cylinders 53.

Figure 12:
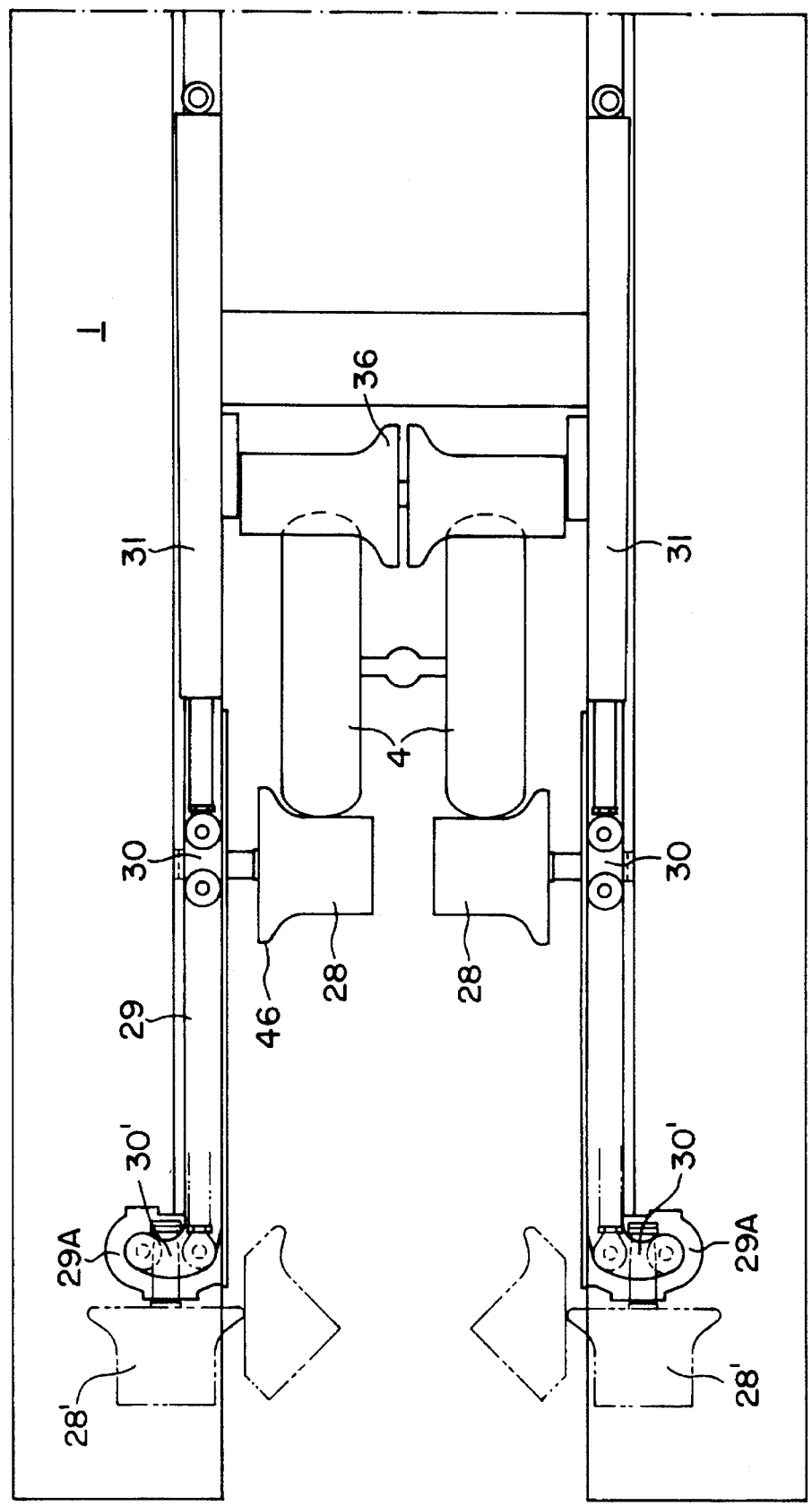
FIG. 12 shows a top view of a second variation with fixed support for the rear roller.

FIG. 12 shows another variation in which the idle rear roller 36 is fixed mounted without shifting and knockoff cylinders 34. This solution may be adopted in a tractor without apron, since the tractor may move away from the aircraft simply by backing. In this second solution featuring a tractor without apron, the idle roller 36 is usually consisting of two components mounted on the same bearing shaft transverse to the tractor to permit independent rotation of the aircraft and of the tractor wheels in curves.

FIG. 13 shows the steering system of the rear wheels as adopted for tractor 1 without apron 32. This servo-assisted hydraulic steering system consists of an arm 49 controlling the wheels 6, a control rod 50 for the arm 49 and a double acting cylinder 51 actuating the rods 50.

Finally, FIG. 6 shows an example of guide rolls 54 to facilitate penetration of the front steering wheels 4 of the aircraft in the tractor recess 3.

I claim:

1. A tractor for towing an aircraft by means of two front steering wheels of the aircraft, said tractor (1) comprising a driver's cab (2); a framework comprising a recess (3) in which to lodge the front steering wheels (4) of the aircraft (5), said framework including an entrance for the front steering wheels to enter said recess; four wheels (6) having tires thereon, said wheels being mounted in front and rear pairs on two independent axles transverse to the tractor (1), with one pair comprising steering wheels for the tractor and the other pair comprising driving wheels for the tractor; and rollers (28, 36), for gripping the wheels (4) of the aircraft, lodged in the recess, characterized in that:

the driver's cab is located in a rear section and the recess (3) in a front section of the tractor (1), two lateral idle front rollers (28) are connected to respective shafts on the tractor framework and extend inwardly, relative to the framework, two slider members (30) are connected to the shafts of the idle front rollers (28), the framework further comprises two lateral guides (29) in which the slider members (30) and shafts are movable, wherein the front end of each of said guides has a cam shaped deflection (29A) bent outwardly, relative to the framework, such that the front rollers (28) are inwardly directed when the sliders are running in a straight longitudinal section of the guides (29) and whereby the front rollers are outwardly moved in a 90° turn at the entrance to said recess (3), when the shafts enter the cam section (29A) of the guide, said tractor further comprising:

two first lateral, hydraulic fluid powered cylinders (31) for actuating movement of the slider members (30), an idle rear roller (36) having its axis transverse to the tractor (1) and connected to the tractor framework by a first knuckle arm, said idle rear roller serving as a support for the aircraft wheels (4) and for removal of the aircraft wheels from the tractor, two lateral levers (35), one end of which is connected to the knuckle arm of the idle rear roller (36) and the other end is connected by means of an articulated joint to the tractor framework (1), two second hydraulic fluid powered cylinders (34) acting on the levers (35) as knock off pistons to push the idle rear roller (36) back and forth, a first microswitch (37) triggered by the levers of the rear roller for blocking the wheels 4 of the aircraft against the rear roller (36), control means (39 thru 45) on the tractor to enable positioning of the aircraft wheels (4) inside the recess of the tractor (1), such that they are blocked therein by the front (28) and rear idle rollers (36).

2. The tractor of claim 1, wherein each wheel (6) of the tractor (1) is supported by two second knuckle arms, comprising an upper (9) and a lower arm (10) secured to the wheel (6) and to the tractor framework (1), and with each upper knuckle arm (9) being controlled by a third hydraulic cylinder (7) and nitrogen bell (8) adapted to support and jack up the tractor framework (1), said tractor further comprising a second microswitch (11) limiting the lifting path of the tractor framework (1) by means of the third cylinder (7), and an apron (32) located in the front recess (3), and secured to the tractor framework (1) whereby said apron is adapted to receive the wheels of the aircraft thereon and to be lifted and lowered together with the framework.

3. The tractor as described in claim 2, characterized in that the apron (32) has a wedge shaped guide step for the wheels (4) of the aircraft.

4. The tractor as described in claim 1, wherein the tractor further comprises a mechanism to move the driver's cab (2) forwards or backwards to prevent the cab from touching the airplane (5).

5. The tractor as described in claim 1, wherein the control means includes:

a hydraulic distributor (38), first pushbutton control means for the first cylinders (31) actuating closing of the idle front rollers (28) to a position for blocking said aircraft wheels, second pushbutton control means (40) for unblocking opening of the rollers (28) in a 90° turn outwards at the entrance to said recess (3), a pressure and control governor (41) for adjustment control of the tractor wheels (6), a pressure release valve (42) for the knockoff pistons (34), third pushbutton means (43) for actuating the third cylinders (7) during raising of the tractor framework;

a lever (44) adapted to provide means for controlling driving of the tractor (1), fourth pushbutton (45) means for actuating the third cylinders (7) during lowering of the tractor framework.

6. The tractor as described in claim 1, wherein the wheels (4) of the aircraft roll on the ground during towing and are entrained by the idle front (28) and rear rollers (36).

7. The tractor as described in claim 6, wherein the front (23) and rear rollers (36) are provided with rings (46) for gripping and guiding the wheels (4) of the aircraft.

8. The tractor as described in claim 6, wherein the rear roller (36) is in two components mounted on the same bearing shaft transverse to the tractor (1) to allow the aircraft-tractor assembly to turn.

9. The tractor as described in claim 6, wherein the rear roller (36, 46, 47) is secured to the tractor framework (1).

10. The tractor as described in claim 1, wherein the idle rear roller comprises two idle rollers (46, 47) located at the end of levers (52) controlled by a fourth hydraulic fluid powered cylinder (53) whereby said two idle rollers (46, 47) may adjust to various wheel diameters of the aircraft to be towed and keep the aircraft wheel axles on a same transverse plane (X—X) as the axles of the front wheels (6) of the tractor (1).

11. The tractor as described in claim 1, wherein the tractor is driven by any one of a heat engine (18), an hydromotor, or an electric motor.

12. The tractor as described in claim 11, wherein the engine or motor is mounted transverse to the tractor centerline, to provide a clear view for the driver.

13. The tractor as described in claim 12, wherein the tractor further comprises a front steering gear for control of the steering wheels, wherein said front steering gear comprises rods (13) and control levers (14) extending around the front recess (3) of the tractor (1).

14. The tractor as described in claim 1, wherein the tractor may be steered by the front and/or rear wheels.

15. The tractor as described in claim 1, wherein the tractor further comprises guide rollers (54) to guide the front steering wheels (4) of the aircraft into the recess (3) of the tractor (1).

* * * * *